US011103988B2

(12) United States Patent
Scigliano et al.

(10) Patent No.: US 11,103,988 B2
(45) Date of Patent: Aug. 31, 2021

(54) JACK HAMMER SILICA DUST SUPPRESSION SYSTEM

(71) Applicant: CJ&S, Inc., Allison Park, PA (US)

(72) Inventors: Nathan Scigliano, Allison Park, PA (US); Chris Livengood, Pittsburgh, PA (US); Jeff Shawley, Sr., Scottdale, PA (US); Jeff Shawley, Jr., Youngwood, PA (US)

(73) Assignee: CJ&S, Inc., Allison Park, PA (US)

( * ) Notice: Subject to any disclaimer, the term of this patent is extended or adjusted under 35 U.S.C. 154(b) by 100 days.

(21) Appl. No.: 16/179,064

(22) Filed: Nov. 2, 2018

(65) Prior Publication Data

US 2019/0134799 A1     May 9, 2019

Related U.S. Application Data

(60) Provisional application No. 62/582,110, filed on Nov. 6, 2017.

(51) Int. Cl.
    *B25D 17/22*      (2006.01)
    *B23Q 11/00*      (2006.01)
    *B05B 9/04*      (2006.01)

(52) U.S. Cl.
    CPC ............ *B25D 17/22* (2013.01); *B05B 9/0426* (2013.01); *B23Q 11/0042* (2013.01); *B25D 2217/0057* (2013.01)

(58) Field of Classification Search
    CPC ........ B25D 17/20; B25D 17/22; B23Q 11/00; B23Q 11/0042
    See application file for complete search history.

(56) References Cited

U.S. PATENT DOCUMENTS

| | | | | |
|---|---|---|---|---|
| 999,429 A * | 8/1911 | Barry | ................. | B23Q 11/1076 |
| | | | | 408/61 |
| 2,235,582 A * | 3/1941 | Klema | ............... | B23Q 11/1084 |
| | | | | 409/136 |
| 2,452,268 A * | 10/1948 | Schumann | .............. | B24B 23/02 |
| | | | | 173/75 |
| 2,937,619 A * | 5/1960 | Kurt | .......................... | E21B 4/14 |
| | | | | 173/17 |

(Continued)

OTHER PUBLICATIONS

Echt et al., "In-depth Survey Report of a Water Spray Device for Suppressing Respirable and Crystalline Silica Dust from Jackhammers", U.S. Department of Health and Human Services, Jun. 29, 2004, Report No. EPHB 282-11c-2, National Institute for Occupational Safety and Health Division of Applied Research and Technology Engineering and Physical Hazards Branch, Cincinnati, OH.

(Continued)

*Primary Examiner* — Gloria R Weeks
(74) *Attorney, Agent, or Firm* — The Webb Law Firm

(57) ABSTRACT

A dust suppression system for a jack hammer includes a spraying device that applies a fluid spray to an area surrounding the jack hammer. The spraying device includes a bracket connected to the jack hammer and a nozzle that creates the fluid spray. The system also includes a fluid source and a pump in fluid communication with the fluid source and the spraying device. The pump directs fluid from the fluid source to the spraying device. The bracket directs fluid from the pump and the fluid source to the nozzle.

15 Claims, 8 Drawing Sheets

(56) References Cited

U.S. PATENT DOCUMENTS

| | | | | |
|---|---|---|---|---|
| 2,994,235 A * | 8/1961 | Rise | E04G 17/00 | 408/112 |
| 3,232,359 A * | 2/1966 | Baglow | E21B 21/02 | 173/198 |
| 3,256,944 A * | 6/1966 | Holzapfel | B25D 17/06 | 173/75 |
| 3,398,609 A * | 8/1968 | Schott | B23Q 11/10 | 408/61 |
| 3,547,350 A * | 12/1970 | Marcoux | B23Q 11/1084 | 239/308 |
| 3,832,772 A * | 9/1974 | Sumida | B23D 49/162 | 30/392 |
| 3,843,198 A * | 10/1974 | Reynolds | E21F 17/00 | 299/18 |
| 3,850,254 A * | 11/1974 | Hirdes | B23Q 11/0046 | 173/75 |
| 3,882,598 A * | 5/1975 | Earle | B23D 59/006 | 30/390 |
| 4,064,952 A * | 12/1977 | Lechner | B23Q 11/006 | 175/209 |
| 4,097,176 A * | 6/1978 | Wanner | B23Q 1/0036 | 175/213 |
| 4,200,417 A * | 4/1980 | Hager | B23Q 11/0046 | 144/251.2 |
| 4,207,953 A * | 6/1980 | Reibetanz | B23B 49/006 | 173/21 |
| 4,361,957 A * | 12/1982 | Krotz | B08B 15/04 | 227/156 |
| 4,854,393 A * | 8/1989 | Palet | B23Q 11/0858 | 173/62 |
| 4,884,341 A * | 12/1989 | Baertlien | A22B 5/0094 | 30/123.3 |
| D305,607 S * | 1/1990 | Andrews | D8/61 | |
| 4,921,375 A * | 5/1990 | Famulari | B23Q 11/0046 | 408/67 |
| 4,986,371 A * | 1/1991 | Lowe | B23Q 11/08 | 173/171 |
| 5,052,756 A * | 10/1991 | Wada | B05B 1/14 | 299/17 |
| 5,090,499 A * | 2/1992 | Cuneo | B23Q 11/0046 | 173/75 |
| 5,113,951 A * | 5/1992 | Houben | B25D 11/005 | 173/75 |
| 5,129,467 A * | 7/1992 | Watanabe | B23Q 11/0046 | 173/217 |
| 5,139,095 A * | 8/1992 | Lyon | E21B 4/14 | 175/100 |
| 5,143,162 A * | 9/1992 | Lyon | E21B 4/14 | 175/100 |
| 5,199,501 A * | 4/1993 | Kluber | B23Q 11/0046 | 173/75 |
| 5,309,714 A * | 5/1994 | Putney | B25B 21/004 | 173/219 |
| 5,467,835 A * | 11/1995 | Obermeier | B23Q 11/0046 | 175/209 |
| 5,588,903 A * | 12/1996 | Pennison | B25F 5/006 | 173/169 |
| 5,591,070 A * | 1/1997 | Kachich | B24B 23/026 | 173/169 |
| 5,688,082 A * | 11/1997 | Richardson | B23Q 11/0046 | 408/113 |
| 5,772,367 A * | 6/1998 | Daniel | B23Q 11/0046 | 173/75 |
| 5,779,402 A * | 7/1998 | Kameda | B23Q 11/006 | 408/56 |
| 5,904,453 A * | 5/1999 | Gavia | B23Q 11/0046 | 408/124 |
| 5,944,263 A * | 8/1999 | Lucco | E21B 21/01 | 239/587.1 |
| 5,988,954 A * | 11/1999 | Gaskin | B23Q 11/0046 | 408/67 |
| 6,039,038 A * | 3/2000 | Buck | B25H 1/0078 | 125/39 |
| 6,079,078 A * | 6/2000 | Byington | B23Q 11/0046 | 144/252.1 |
| 6,105,687 A * | 8/2000 | Hansson | B25F 5/00 | 173/170 |
| 6,131,390 A * | 10/2000 | Hsieh | B25F 5/00 | 173/169 |
| 6,146,066 A * | 11/2000 | Yelton | B23Q 11/0046 | 144/252.1 |
| 6,695,072 B2 * | 2/2004 | Izumisawa | B25B 21/02 | 173/168 |
| 6,751,952 B2 * | 6/2004 | Chen | B25F 5/00 | 173/DIG. 2 |
| 6,830,113 B2 * | 12/2004 | Moore | B23Q 11/0046 | 173/171 |
| 7,281,886 B2 * | 10/2007 | Stoerig | B23Q 11/0046 | 175/213 |
| D593,389 S * | 6/2009 | Clayton | D8/70 | |
| 7,794,184 B2 * | 9/2010 | Di Nicolantonio | B23B 47/00 | 408/67 |
| 8,080,077 B1 * | 12/2011 | Ellis | B23Q 11/0046 | 15/339 |
| 8,152,602 B2 * | 4/2012 | Guth | B23Q 11/0046 | 15/327.5 |
| D678,028 S * | 3/2013 | Rosenau | D8/70 | |
| 9,266,254 B2 * | 2/2016 | Schneider | B28D 7/02 | |
| 9,302,363 B2 * | 4/2016 | Ikuta | B23B 47/34 | |
| 9,687,949 B2 * | 6/2017 | Wasielewski | B24B 55/102 | |
| 10,603,751 B2 * | 3/2020 | Dcunha | E21B 21/015 | |
| 2006/0233618 A1 * | 10/2006 | Puzio | B23B 31/001 | 408/67 |
| 2007/0161344 A1 * | 7/2007 | Clayton | B23B 45/003 | 451/456 |
| 2009/0075572 A1 * | 3/2009 | Izumisawa | B24B 55/10 | 451/294 |
| 2019/0134799 A1 * | 5/2019 | Scigliano | B05B 15/62 | |

OTHER PUBLICATIONS

"Water Spray Control of Hazardous Dust When Breaking Concrete with a Jackhammer", U.S. Department of Health and Human Services, 2008, DHHS (NIOSH) Publication No. 2008-127, National Institute for Occupational Safety and Health Division of Applied Research and Technology Engineering and Physical Hazards Branch, Cincinnati, OH.

"NJ Silicosis Outreach and Research Alliance—Engineering Controls for Crystalline Silica Modifications to Jackhammer Spray Dust Control by NJ DOT", NJ Department of Health, 2007.

"Reduce Silica Exposure During Jackhammer Work", Public Health Services Branch Division of Epidemiology, Environmental and Occupational Health, 2010.

* cited by examiner

JACK HAMMER SILICA DUST SUPPRESSION SYSTEM

CROSS REFERENCE TO RELATED APPLICATIONS

The present application claims priority from U.S. Provisional Patent Application No. 62/582,110, filed on Nov. 6, 2017, which is hereby incorporated by reference in its entirety.

BACKGROUND OF THE INVENTION

Field of the Invention

The invention relates to a dust suppression system for a jack hammer and, in particular, a dust suppression system incorporating a fluid-spraying device connected to the jack hammer by a bracket.

Description of Related Art

Concrete, masonry, and many stone products contain crystalline silica. When a jack hammer is utilized to break up these materials for standard maintenance, re-construction of existing structures, or new construction, a large amount of dust containing crystalline silica particles can be created. This airborne silica dust poses a risk to workers, as exposure may result in the development of certain debilitating lung diseases, such as silicosis.

Recent regulations enacted by the Occupational Safety and Health Administration (OSHA) place strict limits on the amount of exposure to airborne silica dust that workers may experience. One solution to limiting this exposure is to provide workers with air filtration devices and breathing equipment, but such equipment is often bulky and unsuitable for use during conditions of high heat and humidity.

Another solution is to provide water-spraying devices that apply a water spray to the area surrounding a jack hammer to suppress the creation of airborne silica dust in the area being worked on by the jack hammer and trap any crystalline silica particles on the surface being worked on. This solution has not been widely implemented due to difficulty in integrating the spraying device on existing jack hammer tools. Existing jack hammers have no attachment or ability to add a water-based silica dust suppression system.

SUMMARY OF THE INVENTION

According to an example of the present disclosure, a dust suppression system incorporating a water-spraying device is provided for connection to existing jack hammer tools. The spraying device includes a bracket/manifold configured to be connected to existing jack hammer tools quickly and easily without modification to the jack hammer. The bracket/manifold requires no special tools for fitting or removal.

According to a particular example of the present disclosure, a dust suppression system for a jack hammer is provided. The system comprises a spraying device configured to apply a fluid spray to an area surrounding the jack hammer, the spraying device comprising a bracket configured to be connected to the jack hammer and a nozzle configured to create the fluid spray; a fluid source; and a pump in fluid communication with the fluid source and the spraying device, the pump being configured to direct fluid from the fluid source to the spraying device. The bracket is configured to direct fluid from the pump and the fluid source to the nozzle.

The bracket may comprise a top side, a bottom side, and a manifold extending through the bracket from the top side to the bottom side, the nozzle being operatively connected to the bracket in fluid communication with the manifold. The nozzle may be connected to the bracket in fluid communication with the manifold on the bottom side of the bracket.

The system may further comprise a conduit configured to direct fluid from the pump to the spraying device. The spraying device may further comprise a fitting connected in fluid communication with the manifold of the bracket on the top side of the bracket, the fitting connecting the conduit to the bracket and placing the conduit in fluid communication with the manifold and the nozzle.

The system may further comprise a fastening device configured to connect the bracket to the jack hammer, and the bracket may comprise an extended portion, the extended portion being configured to receive the fastening device. The fastening device may comprise a band clamp. The extended portion may extend from the top side of the bracket.

The bracket may comprise an interior side configured to abut against the jack hammer. The interior side of the bracket may be contoured to correspond to the jack hammer. The bracket may be formed as a single monolithic piece.

According to another particular example of the present disclosure, a spraying device for a jack hammer dust suppression system is provided. The spraying device comprises a bracket configured to be connected to a jack hammer, the bracket comprising at least a first side and an opposing second side and a manifold extending through the bracket from the first side to the second side; a fitting connected to the first side of the bracket in fluid communication with the manifold, the fitting being configured to be connected to a fluid source; and a nozzle connected to the second side of the bracket in fluid communication with the manifold, the nozzle being configured to create a fluid spray. The manifold is configured to direct fluid through the bracket from the fitting to the nozzle. The spraying device is configured to apply the fluid spray to an area surrounding the jack hammer.

The bracket may further comprise an extended portion, the extended portion being configured to receive a fastening device for connecting the bracket to the jack hammer. The extended portion may extend from the first side of the bracket. The bracket may further comprise a third side configured to abut against the jack hammer, the third side being contoured to correspond to the jack hammer. The bracket may be formed as a single monolithic piece.

According to another particular example of the present disclosure, a method of suppressing dust during operation of a jack hammer is provided. The method comprises connecting a spraying device to the jack hammer, the spraying device comprising a bracket and a nozzle configured to create a fluid spray; providing a fluid source; providing a pump in fluid communication with the fluid source and the spraying device; directing fluid from the fluid source to the spraying device via the pump; directing the fluid through the bracket to the nozzle; and applying the fluid spray to an area surrounding the jack hammer.

The bracket may comprise at least a top side, a bottom side, and a manifold extending through the bracket from the top side to the bottom side, the nozzle being connected to the bottom side of the bracket in fluid communication with the manifold. The step of directing the fluid through the bracket may comprise directing the fluid through the manifold to the nozzle.

The spraying device may further comprise a fitting connected to the top side of the bracket in fluid communication with the manifold. The method may further comprise providing a conduit configured to direct the fluid from the pump to the spraying device, and connecting the conduit to the fitting to place the conduit in fluid communication with the manifold and the nozzle.

The bracket may comprise an extended portion. The method may further comprise extending a band clamp around the jack hammer and through the extended portion, and securing the band clamp to connect the bracket to the jack hammer. The bracket may be formed as a single monolithic piece.

These and other features and characteristics of the present invention, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DETAILED DESCRIPTION OF THE INVENTION

Figure 1:
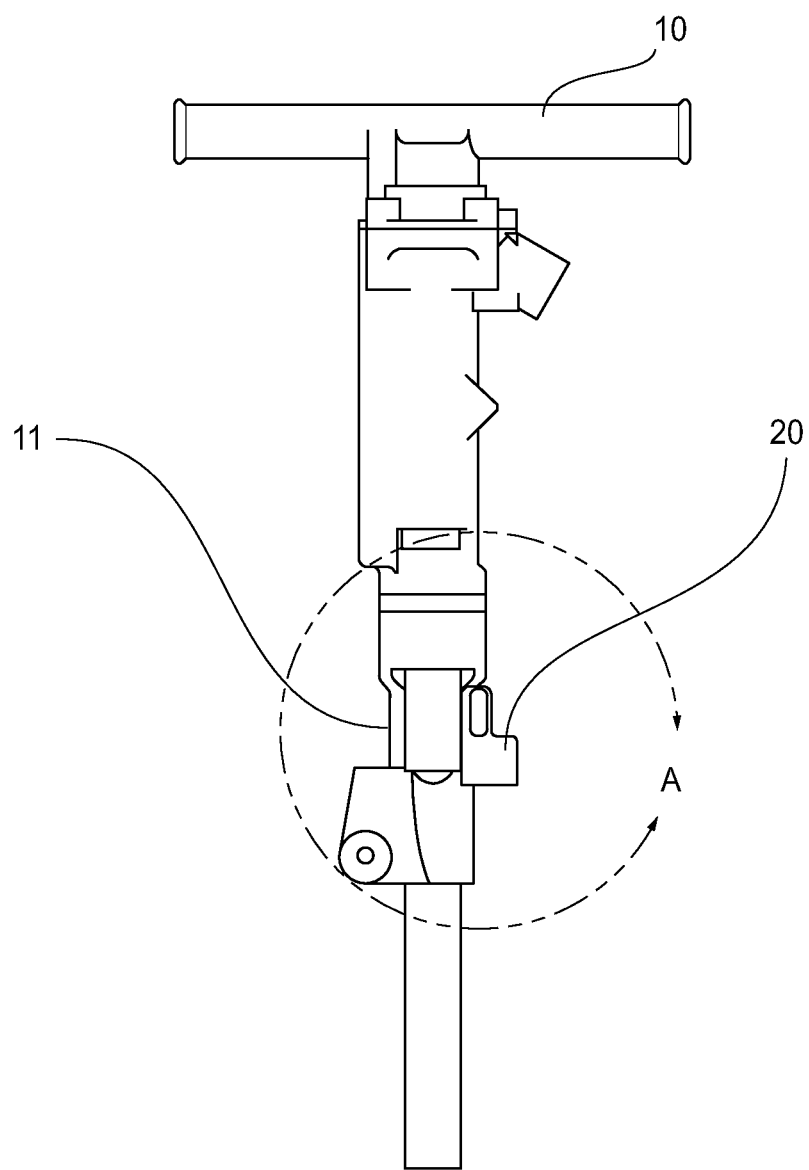
FIG. 1 is a side view of a bracket of a spraying device connected to a jack hammer in accordance with an example of the present disclosure.
Figure 2:
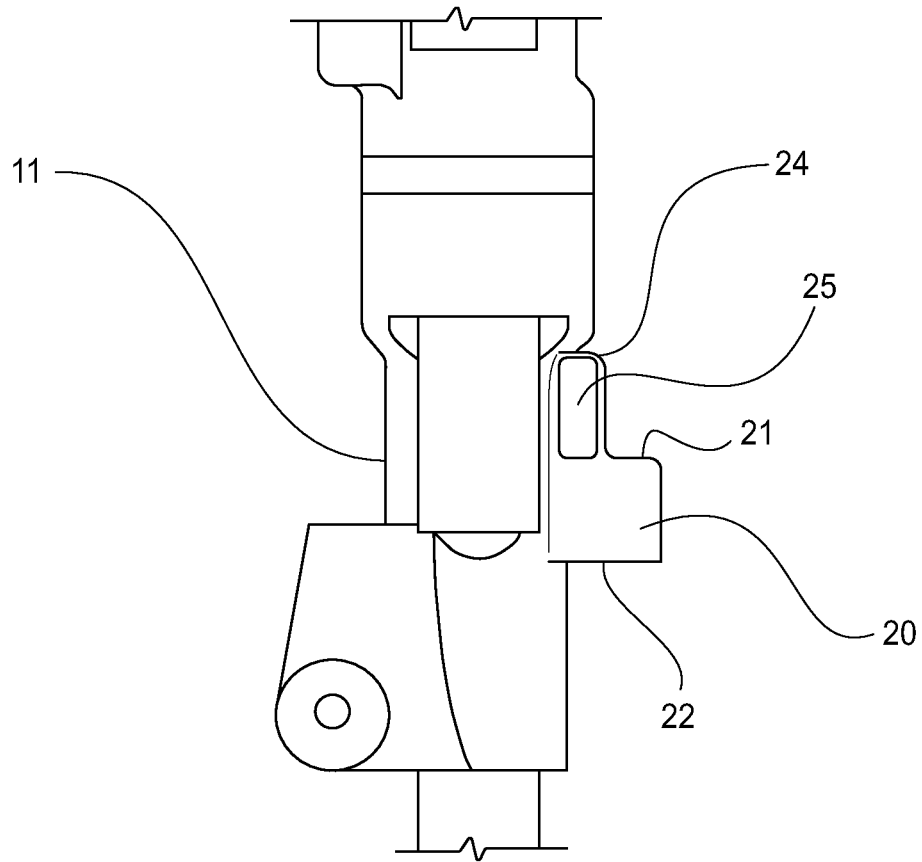
FIG. 2 is an enlarged side view of the area "A" shown in FIG. 1.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings and described in the following specification are simply exemplary embodiments or aspects of the invention. Hence, specific dimensions and other physical characteristics related to the embodiments or aspects disclosed herein are not to be considered as limiting.

With reference to FIGS. 1-6 and 8, a dust suppression system 100 for a jack hammer 10 is shown in accordance with an example of the present disclosure. The system 100 includes a spraying device configured to apply a fluid spray S to an area surrounding the jack hammer body 11 as the jack hammer 10 is operated to work on a section of concrete C. The spraying device includes a bracket 20 configured to be connected to a body 11 of the jack hammer 10, a fitting 104 configured to connect the spraying device in fluid communication with a fluid source 101, and a nozzle 105 configured to create the fluid spray S. The system 100 also includes a fluid source 101 and a pump 102 in fluid communication with the fluid source 101 and the spraying device. The pump 102 is configured to direct fluid from the fluid source to the spraying device. The bracket 20 is configured to direct fluid from the pump 102 and the fluid source 101 to the nozzle 105. According to a particular example of the present disclosure, the fluid utilized in the system is water. It is to be appreciated that any fluid found to be suitable by one having ordinary skill in the art for suppressing the creation of dust in the section of concrete C may be applied utilizing the dust suppression system 100.

Figure 6:
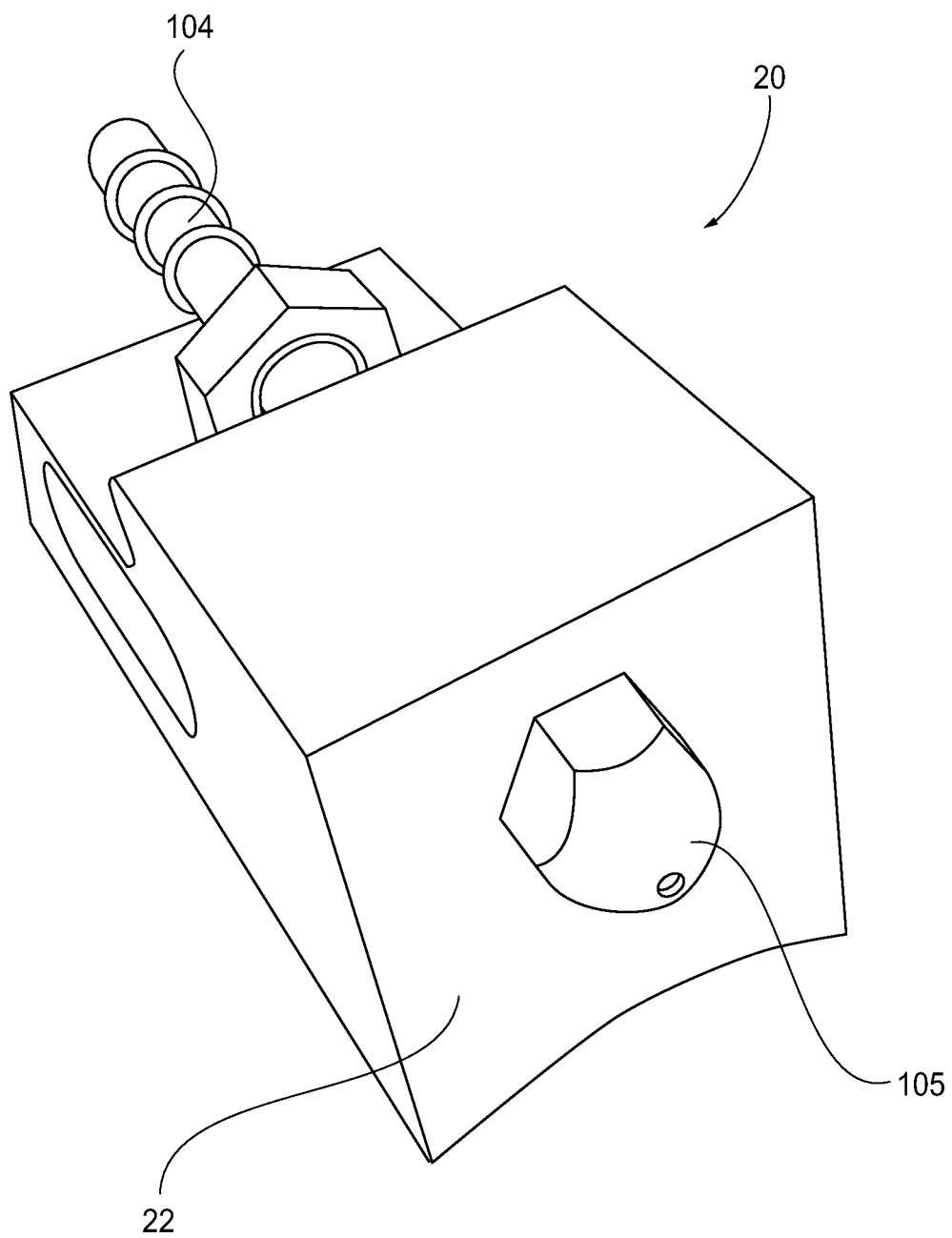
FIG. 6 is a perspective view of the spraying device shown in FIG. 1.
Figure 8:
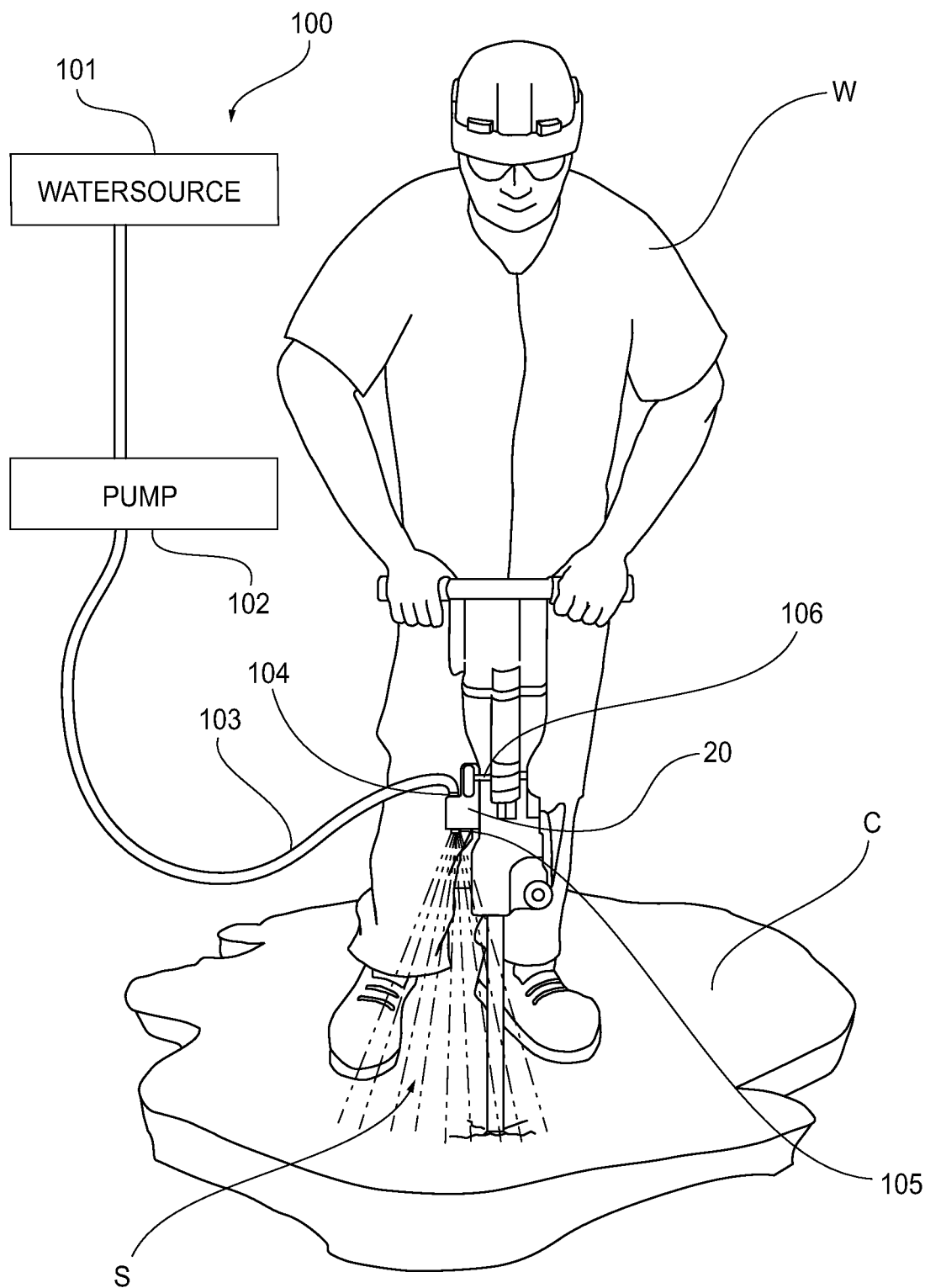
FIG. 8 is a schematic depiction of a working using a jack hammer with a dust suppression system according to an example of the present disclosure.

As shown in FIGS. 1-6 and 8, the bracket 20 includes a top (or first) side 21 and a bottom (or second) side 22. A manifold 27 extends through the bracket 20 from the top side 21 to the bottom side 22. The manifold 27 is connected in fluid communication with the nozzle 105, as shown in FIGS. 6 and 8. In particular, the nozzle 105 is operatively connected to the bracket 20 in fluid communication with the manifold 27 on the bottom side 22 of the bracket 20. According to an example of the present disclosure, the manifold 27 includes an internal threading and the nozzle 105 is a separate off-the-shelf component threadably fastened to the bracket 20 via the manifold 27. It is to be appreciated that alternative constructions of the nozzle 105 and the bracket 20 are possible. For instance, the nozzle 105 may be integrally formed with or machined into the bracket 20, or the nozzle 105 may be a customized component.

As also shown in FIGS. 6 and 8, the system 100 may further include a conduit or hose 103 configured to direct fluid from the pump 102 to the bracket 20. The fitting 104 is provided to connect the conduit 103 in fluid communication with the manifold 27 on the top (or first) side 21 of the bracket 20. The fitting 104 connects the conduit 103 to the bracket 20 and places the conduit 103 in fluid communication with the manifold 27 and the nozzle 105. The manifold 27 acts to place the fitting 104 in fluid communication with the nozzle 105 and to direct the fluid through the bracket 20 from the fitting 104 to the nozzle 105. According to the example of the present disclosure, the fitting 104 is a separate off-the-shelf component threadably fastened to the bracket 20 via the manifold 27. It is to be appreciated that alternative constructions of the fitting 104 to the bracket 20 are possible. For instance, the fitting 104 may also be integrally formed with or machined into the bracket 20, or the fitting 104 may be a customized component.

With reference to FIGS. 1-6 and 8, the system 100 further includes a fastening device, such as a band clamp 106, which connects the bracket 20 to the body 11 of the jack hammer 10. The bracket 20 includes an extended portion 24 extending from the top (or first) side 21 of the bracket 20. The extended portion 24 defines an elongated opening 25 configured to receive the band clamp 106 to allow the band clamp 106 to be passed through the extended portion 24 of the bracket 20 and around a portion of the body 11 of the jack hammer 10 to fasten the bracket 20 to the jack hammer 10. The bracket 20 includes an interior (or third) side 26 that is contoured, such as with a concave curvature, to correspond to an exterior surface of the body 11 of the jack hammer 10, such that the interior side 26 of the bracket 20 may be abutted against an exterior surface of the body 11 of the jack hammer 10 to provide a close engagement and secure fastening between the bracket 20 and the jack hammer 10. Accordingly, the system 100, particularly the bracket 20, may be provided as a retrofit to an existing jack hammer 10 without requiring modification or permanent alteration to the jack hammer 10. It is to be appreciated that different fastening mechanisms or configurations of the bracket 20 may be provided. For instance, the orientation of the bracket 20 may be reversed with the extended portion 24 extending from the bottom side 22 of the bracket 20, or the extended portion 24 and opening 25 may be formed between the interior side 26 and the manifold 27. Different types of fasteners other than the band clamp 106 may also be provided as found to be suitable to those having ordinary skill in the art.

Figure 3:
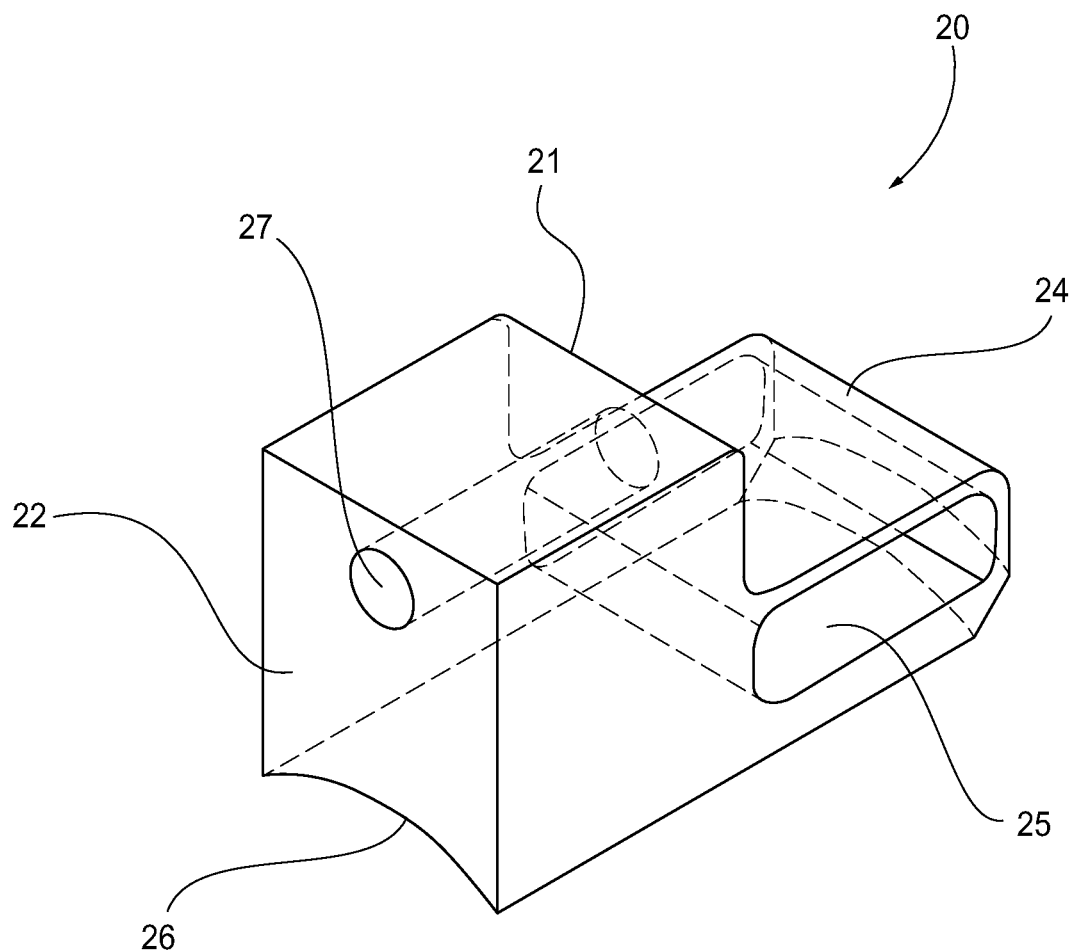
FIG. 3 is a perspective view of the bracket of the spraying device shown in FIG. 1.
Figure 3A:
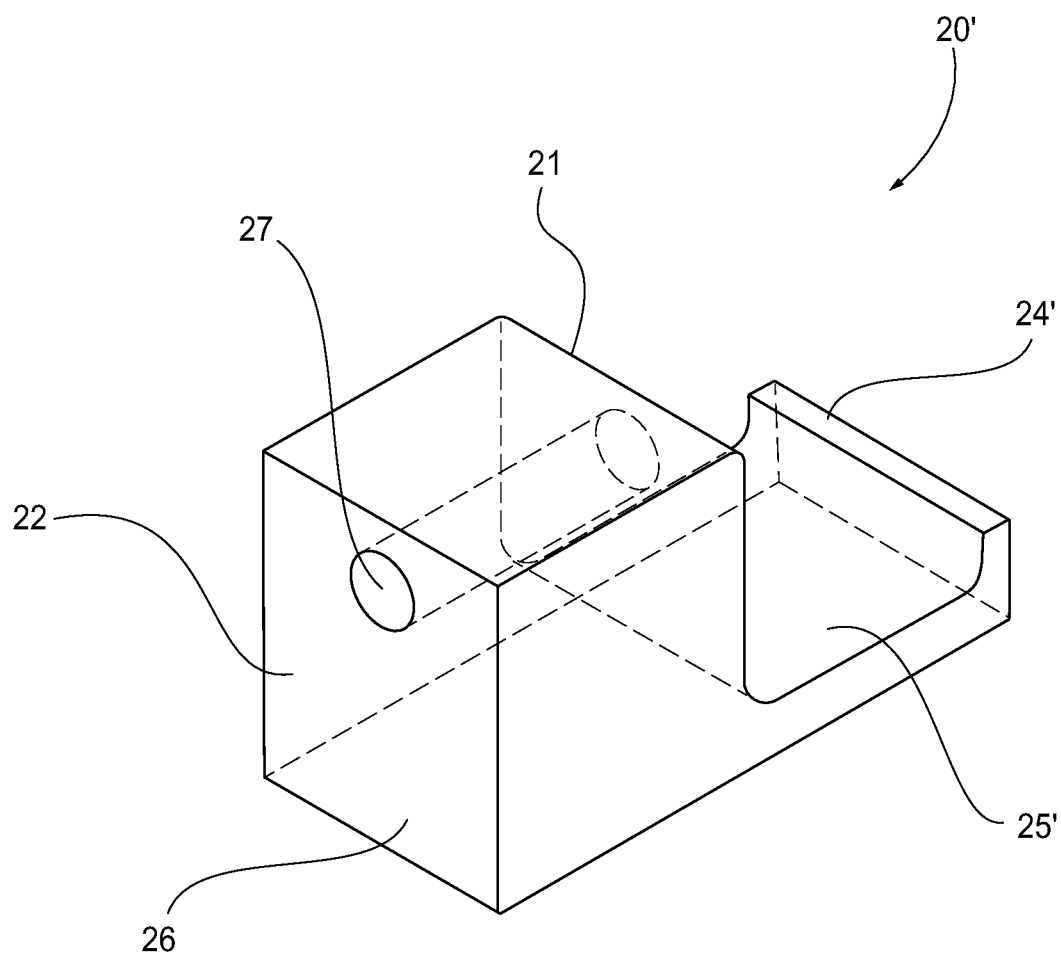
FIG. 3A is a perspective view of a bracket in accordance with another example of the present disclosure.
Figure 4:
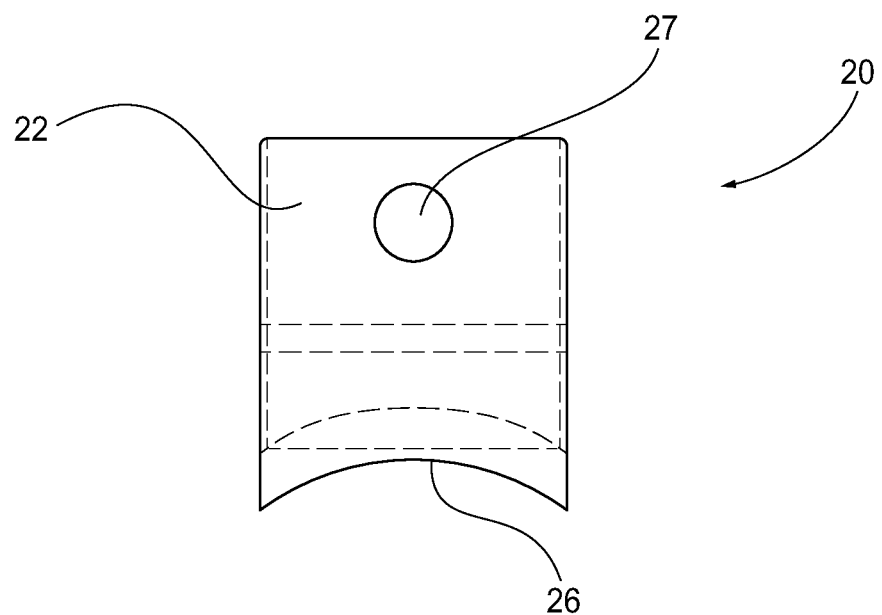
FIG. 4 is a bottom view of the bracket of FIG. 3.
Figure 5:
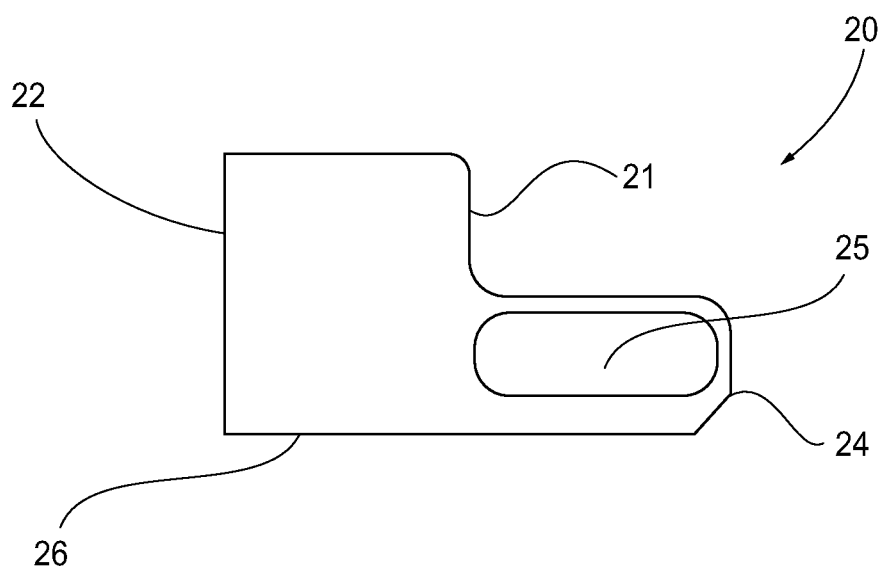
FIG. 5 is a side view of the bracket of FIG. 3.

With reference to FIG. 3A, according to another example of the present disclosure, a bracket 20' includes an extended portion 24' having a hooked shape or substantially hooked shape defining a recessed area 25' configured to receive the band clamp 106 to allow the band clamp 106 to be passed through the extended portion 24' of the bracket 20' and around the portion of the body 11 of the jack hammer 10 to fasten the bracket 20' to the jack hammer 10.

According to an example of the present disclosure, the bracket 20 is formed as a single monolithic piece machined or manufactured from a suitable corrosion-resistant metal material, such as aluminum or stainless steel. It is to be appreciated that the bracket 20 may be formed from any material and according to any technique known to be suitable to those having ordinary skill in the art.

Figure 7:
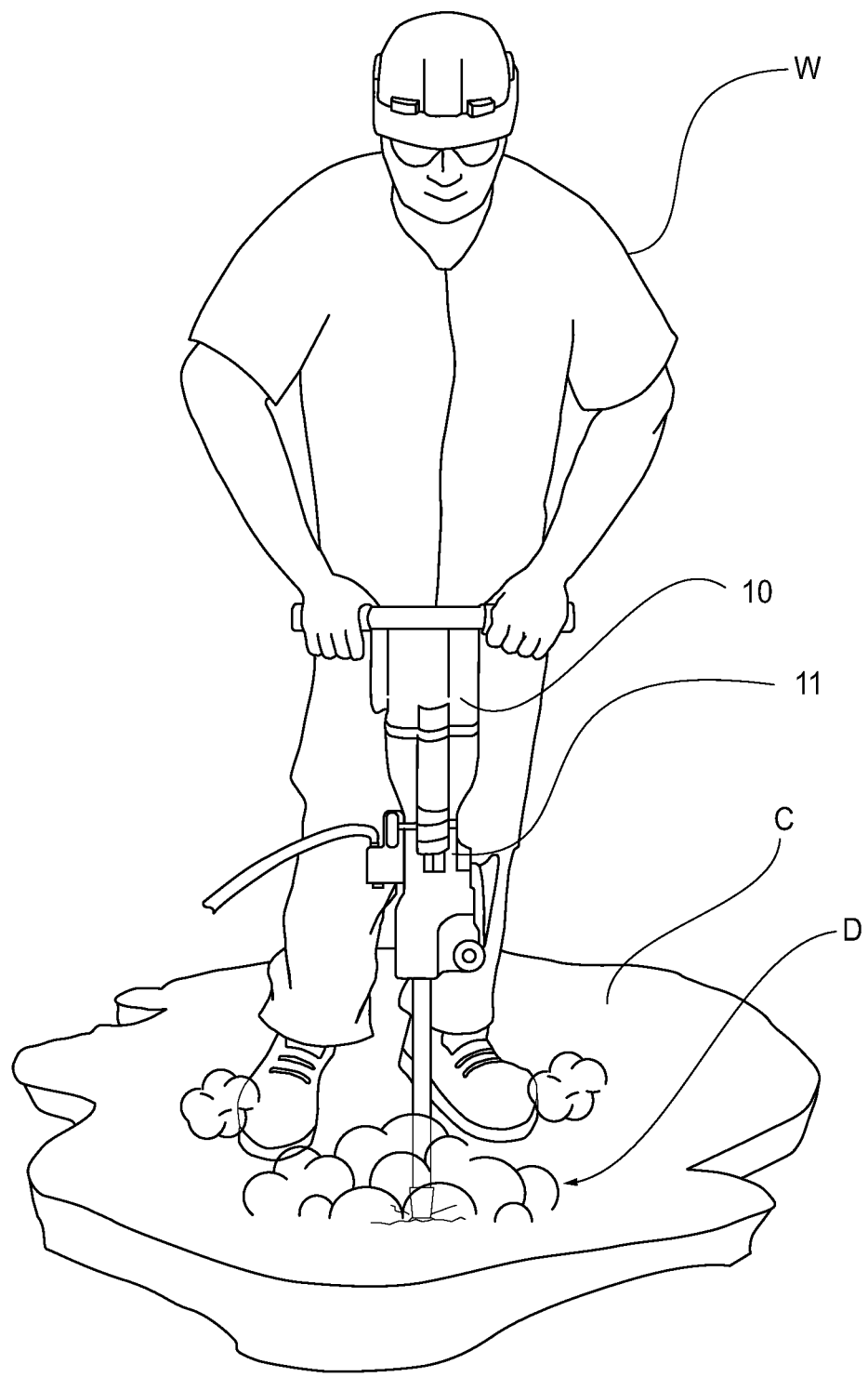
FIG. 7 is a schematic depiction of a worker using a jack hammer on a concrete area without dust suppression.

FIG. 7 illustrates the conditions of use of a jack hammer 10 by a worker W while working on a section of concrete C or similar material. The breaking up of the concrete material by the jack hammer 10 creates a large amount of airborne silica dust D, which is then inhaled by the worker W. The inhalation of this dust D by the worker W may result in the worker W developing a debilitating lung condition, such as silicosis. Recent regulations enacted by OSHA provide stringent limitations on the amount of airborne silica dust to which workers may be exposed during work on silica-containing materials, such as concrete, in order to prevent or limit the development of respiratory illness by workers.

As shown in FIG. 8, the system 100 includes the fluid source 101, which may be a municipal water supply or a local supply, such as a water buffalo or tank. The pump 102, which may be an electric sump pump, directs fluid through the conduit 103 to the bracket 20 connected to the jack hammer 10 that is actively breaking concrete material. The bracket 20 includes a manifold 27 to direct fluid through the bracket 20 from the conduit 103 to the spray nozzle 105, which then generates the fluid spray S directed onto the chip-breaking zone of the section of concrete C to effectively suppress the generation of airborne silica dust. According to one example, the nozzle 105 is configured to spray 6.3 gallons of fluid per hour with an 80° spray angle, full cone spray pattern. The bracket 20 may be specifically configured to be mounted on a Chicago Pneumatic CP 0112 S and CP 1210 S pneumatic chip breaking jack hammer, but it is to be appreciated that the bracket 20 may be configured to fit onto any type of existing jack hammer tool.

The system 100 according to the example of the present disclosure drastically reduces generation of airborne silica dust while a jack hammer 10 is operated on a section of concrete C or similar material in order to prevent or minimize the exposure of dust to not only to the worker W operating the jack hammer, but also to those in the area of the section of concrete C, and thereby prevent or minimize respiratory damage caused by airborne silica dust to the worker W and those in the area. This is achieved through the application of the fluid spray S by the spraying device to the concrete-breaking area directly under and around the chisel of the jack hammer 10. The system 100 shown in FIG. 7 is a durable, easy-to-attach, and easily usable system to protect workers and comply with the recently enacted regulations.

With reference to FIGS. 1-6 and 8, according to another example of the present disclosure, a method of suppressing dust during operation of the jack hammer 10 is provided. The method includes connecting a spraying device to the jack hammer 10. The spraying device includes a bracket 20 and a nozzle 105 configured to create a fluid spray S. The method further includes providing a fluid source 101 and a pump 102 in fluid communication with the fluid source 101 and the spraying device. The fluid is directed from the fluid source 101 to the spraying device via the pump 102. The fluid is then directed through the bracket 20 to the nozzle 105. A fluid spray S is then applied to an area, for instance a concrete section C, surrounding the jack hammer 10.

The bracket 20 includes at least a top side 21, a bottom side 22, and a manifold 27 extending through the bracket 20 from the top side 21 to the bottom side 22. The nozzle 105 is connected to the bottom side 22 of the bracket 20 in fluid communication with the manifold 27. During the step of directing the fluid through the bracket 20, the fluid is directed through the manifold 27 to the nozzle 105.

The spraying device further includes a fitting 104 connected to the top side 21 of the bracket 20 in fluid communication with the manifold 27. A conduit 103 is provided to direct the fluid from the pump 102 to the spraying device. The conduit 103 is connected to the fitting 104 to place the conduit 103 in fluid communication with the manifold 27 and the nozzle 105.

The bracket 20, 20' includes an extended portion 24, 24'. A band clamp 106 is extended around the jack hammer 10 and through the extended portion 24 and is then secured to connect the bracket 20 to the jack hammer 10. The bracket 20 may be formed as a single monolithic piece.

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects but, on the contrary, is intended to cover modifications and equivalent arrangements that are within the spirit and scope thereof. For example, it is to be understood that the present invention contemplates that to the extent possible, one or more features of any embodiment or aspect can be combined with one or more features of any other embodiment or aspect.

The invention claimed is:

1. A dust suppression system for a jack hammer, comprising:

a spraying device configured to apply a fluid spray to an area surrounding the jack hammer, the spraying device comprising a bracket configured to be connected to the jack hammer and a nozzle configured to create the fluid spray;

a fluid source; and a pump in fluid communication with the fluid source and the spraying device, the pump being configured to direct fluid from the fluid source to the spraying device, wherein the bracket comprises a top side, a bottom side, an interior side configured to abut against the jack hammer, and a manifold extending through the bracket from the top side to the bottom side, wherein the nozzle is fastened to the bottom side of the bracket in fluid communication with the manifold, wherein the bracket is configured to direct fluid from the pump and the fluid source to the nozzle via the manifold, wherein the system further comprises a fastening device configured to connect the bracket to the jack hammer, the bracket further comprising an extended portion extending from the top side of the bracket configured to receive the fastening device, and wherein the interior side of the bracket extends from the bottom side of the bracket to a top end of the extended portion above the top side of the bracket.

2. The dust suppression system according to claim 1, further comprising a conduit configured to direct fluid from the pump to the spraying device, wherein the spraying device further comprises a fitting connected in fluid communication with the manifold of the bracket on the top side of the bracket, and wherein the fitting connects the conduit to the bracket and places the conduit in fluid communication with the manifold and the nozzle.

3. The dust suppression system according to claim 1, wherein the fastening device comprises a band clamp.

4. The dust suppression system according to claim 1, wherein the interior side of the bracket is contoured to correspond to the jack hammer.

5. The dust suppression system according to claim 1, wherein the bracket is formed as a single monolithic piece.

6. The dust suppression system according to claim 1, wherein the manifold comprises an internal threading and the nozzle is threadably fastened to the bottom side of the bracket via the manifold.

7. A spraying device for a jack hammer dust suppression system, the spraying device comprising:

a bracket configured to be connected to a jack hammer, the bracket comprising at least a first side and an opposing second side, a third side configured to abut against the jack hammer, and a manifold extending through the bracket from the first side to the second side;

a fitting fastened to the first side of the bracket in fluid communication with the manifold, the fitting being configured to be connected to a fluid source; and a nozzle fastened to the second side of the bracket in fluid communication with the manifold, the nozzle being configured to create a fluid spray, wherein the manifold is configured to direct fluid through the bracket from the fitting to the nozzle, wherein the spraying device is configured to apply the fluid spray to an area surrounding the jack hammer, wherein the bracket further comprises an extended portion extending from the first side of the bracket, the extended portion being configured to receive a fastening device for connecting the bracket to the jack hammer, and wherein the third side of the bracket extends from the second side of the bracket to an end of the extended portion beyond the first side of the bracket.

8. The spraying device according to claim 7, wherein the third side is contoured to correspond to the jack hammer.

9. The spraying device according to claim 7, wherein the bracket is formed as a single monolithic piece.

10. The spraying device according to claim 7, wherein the manifold comprises an internal threading and the nozzle is threadably fastened to the second side of the bracket via the manifold.

11. A method of suppressing dust during operation of a jack hammer, the method comprising:

connecting a spraying device to the jack hammer, the spraying device comprising a bracket and a nozzle configured to create a fluid spray;

providing a fluid source;

providing a pump in fluid communication with the fluid source and the spraying device;

directing fluid from the fluid source to the spraying device via the pump;

directing the fluid through the bracket to the nozzle; and applying the fluid spray to an area surrounding the jack hammer, wherein the bracket comprises at least a top side, a bottom side, an interior side configured to abut against the jack hammer, and a manifold extending through the bracket from the top side to the bottom side, wherein the bracket further comprises an extended portion extending from the top side of the bracket configured to receive a band clamp configured to connect the bracket to the jack hammer, and wherein the interior side of the bracket extends from the bottom side of the bracket to a top end of the extended portion above the top side of the bracket wherein the nozzle is fastened to the bottom side of the bracket in fluid communication with the manifold, and wherein the step of directing the fluid through the bracket comprises directing the fluid through the manifold to the nozzle.

12. The method according to claim 11, wherein the spraying device further comprises a fitting connected to the top side of the bracket in fluid communication with the manifold, the method further comprising:

providing a conduit configured to direct the fluid from the pump to the spraying device; and connecting the conduit to the fitting to place the conduit in fluid communication with the manifold and the nozzle.

13. The method according to claim 11, wherein the method further comprises:

extending the band clamp around the jack hammer and through the extended portion; and securing the band clamp to connect the bracket to the jack hammer.

14. The method according to claim 11, wherein the bracket is formed as a single monolithic piece.

15. The method according to claim 11, wherein the manifold comprises an internal threading and the nozzle is threadably fastened to the bottom side of the bracket via the manifold.

* * * * *